(12) United States Patent  
Behruzi et al.

(10) Patent No.: US 9,108,144 B2
(45) Date of Patent: Aug. 18, 2015

(54) TANK FOR SEPARATING LIQUID FROM GAS UNDER WEIGHTLESS CONDITIONS

(71) Applicant: Astrium GmbH, Taufkirchen (DE)

(72) Inventors: Kei Philipp Behruzi, Bremen (DE); Nicolas Fries, Bremen (DE); Burkhard Schmitz, Weyhe (DE); Horst Koehler, Bremen (DE)

(73) Assignee: Astrium GmbH, Taufkirchen (DE)

( * ) Notice: Subject to any disclaimer, the term of this patent is extended or adjusted under 35 U.S.C. 154(b) by 150 days.

(21) Appl. No.: 13/898,649

(22) Filed: May 21, 2013

(65) Prior Publication Data

US 2014/0345464 A1 Nov. 27, 2014

(51) Int. Cl.
B01D 45/08 (2006.01)
F17C 13/08 (2006.01)
B01D 53/04 (2006.01)

(52) U.S. Cl.
CPC ............ *B01D 53/0407* (2013.01); *B01D 45/08* (2013.01); *F17C 13/08* (2013.01)

(58) Field of Classification Search
CPC .................. B01D 53/0407; B01D 2253/1122; B01D 2259/4575; B01D 29/0054; B01D 29/0059; B01D 39/2027; B01D 39/2051; B01D 45/08
USPC .................. 96/108, 121, 131, 134, 139, 152; 55/441, 525, DIG. 42
See application file for complete search history.

(56) References Cited

U.S. PATENT DOCUMENTS

| | | | | |
|---|---|---|---|---|
| 1,820,530 A | * | 8/1931 | Davies | 55/441 |
| 2,205,336 A | * | 6/1940 | Beach | 210/519 |
| 3,300,949 A | * | 1/1967 | Smylie et al. | 95/117 |
| 3,721,069 A | * | 3/1973 | Walker | 55/319 |
| 3,807,144 A | * | 4/1974 | Graybill | 96/292 |
| 4,027,494 A | | 6/1977 | Fletcher et al. | |
| 4,435,196 A | | 3/1984 | Pielkenrood | |
| 4,617,031 A | | 10/1986 | Suh et al. | |

(Continued)

FOREIGN PATENT DOCUMENTS

| | | |
|---|---|---|
| DE | 102004061027 | 6/2006 |
| DE | 102007005539 | 8/2008 |
| DE | 102011122352 | 6/2013 |
| EP | 1 988 326 | 11/2008 |
| JP | 60-082107 A | 5/1985 |
| JP | 2002-337798 A | 11/2002 |
| WO | WO 01/85604 | 11/2001 |
| WO | WO 2007/031064 | 3/2007 |

OTHER PUBLICATIONS

European Search Report for European Application No. EP 13 00 2659, dated Oct. 10, 2013, 3 pages, Muenchen, Germany, with English translation, 3 pages.

*Primary Examiner* — Frank Lawrence
(74) *Attorney, Agent, or Firm* — W. F. Fasse

(57) ABSTRACT

A separator tank for separating and retaining a liquid phase from a liquid-gas fluid mixture is suitable for use with cryogenic as well as non-cryogenic liquids, in space experiments or other applications under weightless conditions. The separator tank has liquid storage members of porous, sponge-like metal foam arranged in a tank vessel. The total pore volume and porosity characteristics of the metal foam are selected to provide capillary uptake greater than the total volume of the liquid to be retained. In a preferred example, the liquid storage members are coaxially arranged, radially spaced, annular cylindrical members, with flow passage notches at alternating opposite ends thereof, to form a meandering fluid flow path therebetween. A gas extraction device is provided at the center of the tank. The separator tank and an upstream connected fluid supply tank can be arranged within a cryostat.

21 Claims, 7 Drawing Sheets

(56) References Cited

U.S. PATENT DOCUMENTS

| | | |
|---|---|---|
| 4,848,987 A | 7/1989 | Howard et al. |
| 4,938,785 A * | 7/1990 | MacPherson et al. .......... 95/272 |
| 6,238,464 B1 * | 5/2001 | Dullien .......................... 95/282 |
| 6,875,247 B2 * | 4/2005 | TeGrotenhuis et al. ......... 55/319 |
| 7,077,885 B2 | 7/2006 | Charlat |
| 8,048,211 B2 | 11/2011 | Behruzi et al. |
| 2003/0167923 A1 | 9/2003 | Grote et al. |
| 2005/0268647 A1 | 12/2005 | Finamore |
| 2009/0134170 A1 | 5/2009 | Behruzi et al. |
| 2010/0213084 A1 | 8/2010 | Hirose |
| 2011/0247310 A1 * | 10/2011 | Hahnl et al. .................... 55/498 |

* cited by examiner

TANK FOR SEPARATING LIQUID FROM GAS UNDER WEIGHTLESS CONDITIONS

PRIOR RELATED APPLICATION

This application is based on earlier German Patent Application 10 2011 122 352.9 filed on Dec. 23, 2011, the disclosure of which is incorporated herein by reference.

FIELD OF THE INVENTION

The invention relates to a tank for separating a liquid phase from a gaseous phase and for storing the separated liquid, especially for use under weightless conditions, for example for applications in experiments in space. A supply line supplies a liquid, a gas, or a liquid-gas mixture to the separator tank, while pure gas (without liquid) exits the tank through a tank outlet thereof.

BACKGROUND INFORMATION

Such a tank as described above is generally known as a separator tank. The liquid introduced into such a separator tank is typically to be stored therein for the duration of a space experiment or other space mission. The liquid may be a propellant or fuel, or some other liquid, that is supplied to the separator tank from a supply or test tank that is connected upstream to the separator tank. A pressurized propellant or driving gas, typically an inert gas such as helium (He) or nitrogen ($N_2$) gas, is supplied under pressure into the upstream supply tank and serves to pressurize and drive the fluid out of the supply tank through a pipeline system into the separator tank. Thereby, the fluid supplied from the supply tank to the separator tank may comprise a liquid, a gas, or a liquid-gas mixture. Simultaneously, a corresponding quantity of pure gas (without liquid) is driven out of the separator tank, whereby this extracted gas is typically emitted or ejected out of the experimental module into the vacuum of space prevailing at the orbit of the experimental module. If a liquid-gas mixture escapes from the separator tank and is emitted or ejected out into the vacuum of space, this leads to a varying density of the ejected fluid, i.e. a varying density of the ejected liquid and gas depending on the mixture ratio of the two phases, which in turn causes an inconstant or varying thrust profile. For this reason, such ejection of a liquid-gas mixture is undesirable and is to be avoided. Particularly, it is desired to ensure that only pure gas is output from the separator tank.

The following processes are known and utilized in the field of space travel technology for achieving a sure and reliable separation of the liquid phase from the gas phase. First, by heating the propellant or other liquid-gas mixture coming from the supply tank, thereby the liquid in such a mixture is vaporized into the gas phase. However, this process requires a relatively high expenditure of energy for heating and vaporizing the liquid. A second known procedure involves applying an additional acceleration or settling thrust to cause the liquid propellant to settle at a portion of the tank away from the gas outlet, so that at the time of the pressure release or gas extraction from the tank, no liquid is located at or near the tank outlet. This, however, requires a precisely directed and metered acceleration by means of an additional thruster or other drive system, which is excluded in the case of a weightless experiment though, because it would impair the boundary conditions of the experiment.

Additionally, the U.S. Pat. No. 4,027,494 discloses the use of phase separators for separating a liquid from a gaseous phase, in an apparatus with a phase separator for operating conditions with small acceleration, and the separation of gas from liquid is carried out using superconducting magnets. Furthermore, U.S. Pat. No. 4,848,987 discloses a phase separator in which pumps and a series of valves are provided to achieve the separation. Also, U.S. Pat. No. 7,077,885 discloses a phase separator that uses a propeller to impose a rotation on the liquid-gas mixture, and includes a membrane of polyethylene or nylon by which the liquid, in this case water, is separated from the gas. The latter known system is provided for use in an application with fuel cells and is not suitable for separating cryogenic liquids. Still further, U.S. Pat. No. 4,435,196 and U.S. Pat. No. 4,617,031 disclose apparatuses for separating a liquid phase from a gas phase in applications limited to use in the gravitational field on earth.

Moreover, U.S. Pat. No. 4,027,494 discloses an arrangement that supplies a pure liquid that has been purified of possible gas inclusions or admixtures. For separating the gas from the liquid, this known arrangement includes a honeycomb-like structure arranged over a liquid outlet, which ensures that no gas can penetrate into the liquid outlet line.

An apparatus disclosed in U.S. Pat. No. 4,435,196 includes a porous bed structure in the form of a per se known catalyst bed for producing gas from a liquid propellant or fuel, for example hydrazine. This patent further discloses a liquid-gas separator comprising a titanium net that aims to restrain or hold back gas bubbles due to the effects of capillary forces and surface tension.

Finally, the German Patent DE 10 2007 005 539 and its counterpart U.S. Pat. No. 8,048,211 disclose an arrangement of the general type initially described above, in which a separator is arranged as a component in a propellant tank, wherein a liquid-gas mixture at various locations in the propellant tank can reach a reservoir provided for storing the liquid.

SUMMARY OF THE INVENTION

In view of the above, it is an object of the invention to provide an improved construction of such a separator tank, so that the tank is able to achieve a sure and reliable phase separation for both cryogenic as well as non-cryogenic fuels or propellants or other liquids, at accelerations as they arise during a space experiment or zero gravity experiment in a high altitude research or sounding rocket, for example. Furthermore, the inventive separator tank aims to ensure such phase separation in a simple manner, with a simple, reliable and robust construction, and with simple components, at an economical cost and effort. Furthermore, the tank aims to separate the liquid phase from the gas phase and store the separated liquid in the tank, without allowing the liquid to leave the tank, neither through an inlet nor an outlet thereof. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a separator tank for separating a liquid phase from a gaseous phase and for storing the separated liquid. This tank is especially suitable for use in experiments in space under weightless conditions. The tank has an inlet through which the tank receives a fluid comprising a liquid, a gas and/or a mixture of liquid and gas. The tank has an outlet from which pure gas (i.e. without liquid) exits the tank. For separating and storing the liquid, the tank arrangement includes a tank vessel in which liquid storage members are arranged. The liquid storage members are made of a metal foam, and preferably a sponge-like open-celled porous metal foam. The number, dimensions, configuration and arrangement of the liquid storage members, and the porosity and the pore size of the metal foam are selected so that the total pore volume of the metal foam of all of the liquid storage members is greater than the total volume of the liquid to be stored in the liquid storage members. By this construction of the separator tank according to the invention, it can be achieved that the liquid is taken-up or absorbed in a capillary manner in the pores of the sponge-like metal foam and is stored therein stably for the duration of the experiment or mission. The pore parameters such as the pore size, pore shape, number of pores, and total porosity of the metal foam are selected appropriately for the type and quantity of liquid that is to be separated and stored, so as to provide the required capillarity and liquid storage capacity.

In a preferred embodiment, the metal foam is particularly an aluminum foam. As mentioned above, the total pore volume (and preferably especially the total capillarily available volume) of the metal foam is selected to be greater than the total volume of the liquid to be separated and stored during the experiment or mission. This also means that the total volume of the metal foam is greater than the total volume of the total liquid to be taken-up, by a factor inversely related to the porosity of the metal foam.

The liquid storage members are arranged in the manner of alternately staggered baffles to form an alternating or meandering fluid flow path through the separator tank from the inlet to the outlet thereof. Thus, the fluid, e.g. a liquid-gas mixture, entering the tank through the inlet meanders through the flow path between and along the liquid storage members in the separator tank, and thereby the liquid is capillarily attracted and absorbed or taken-up into the pores of the sponge-like metal foam material. Because the pores of the metal foam are interconnected in an open-celled manner, the liquid is drawn by capillary action progressively farther into the body of each respective liquid storage member, as more liquid is attracted by the capillary action at the surface of the liquid storage member.

In a simple embodiment, each liquid storage member consists of the metal foam, but optionally there may be additional cover layers in the form of a mesh or the like to hold or confine or support the surfaces of the metal foam members, or in the form of an imperforate or solid sheet to prevent the flow of fluid transversely through the thickness of the metal foam of the liquid storage member. As a further optional feature, the tank arrangement may additionally comprise a metal mesh or screen arranged in front of the outlet of the separator tank, to catch any particles of the sponge-like metal foam material that might become separated from the liquid storage members, to thereby prevent any such loose metal foam particles from reaching the outlet and flowing out of the separator tank through the outlet together with the liquid-free gas.

In the above described manner, the liquid is thus taken-up and temporarily stored in the metal foam of the liquid storage members in the separator tank serving as a reservoir. As the case may be, any propellant or driving gas located in the tank at the beginning is first driven out and replaced by the liquid that is taken-up in the liquid storage members, i.e. the gas originally in the pores is replaced by the liquid. The characteristics of the tank, the liquid storage members, the metal foam material thereof, and the pore characteristics thereof are all designed or selected appropriately so that the capillary action of the metal foam with respect to the particular liquid will ensure that the liquid is reliably taken-up and stored within the pores of the metal foam. Metal foams are also very advantageous and suitable for storing cryogenic liquids in the manner according to the invention, because such metal foams have a very low structural mass, so that only a small structural mass must be cooled by the liquid to achieve the required cryogenic conditions. Furthermore, such metal foams have pores and porosity characteristics that provide a high capillary pressure difference or capillary attraction, which is very advantageous, because it ensures that the liquid will be surely and reliably held in the pores of the metal foam even under the influence of high interfering accelerations, such as may arise in the operation of a sounding rocket or other space vehicle. The maximum storage capacity for liquid is reached when the porous metal foam of the liquid storage members is completely saturated or maximally saturated with liquid. For this reason, according to the invention, the volume of the metal foam, or particularly the open-cell pore volume of the metal foam, is dimensioned to be greater than the maximum quantity of liquid that needs to be taken-up and stored during a given experiment or other mission. In view of the above, the inventive separator tank is especially well suited for use in connection with such space experiments under weightless conditions that require the use of one or more cryogenic liquids.

BRIEF DESCRIPTION OF THE DRAWINGS

In order that the invention may be clearly understood, it will now be described in further detail in connection with example embodiments thereof, with reference to the accompanying drawings, wherein.

DETAILED DESCRIPTION OF PREFERRED EXAMPLE EMBODIMENTS AND THE BEST MODE OF THE INVENTION

Throughout the several figures of the drawings, the same components and corresponding components are identified by the same reference numbers. References to radial and axial directions are with respect to the central axis of the liquid separator tank, which is cylindrical in the present example embodiment.

Figure 1:
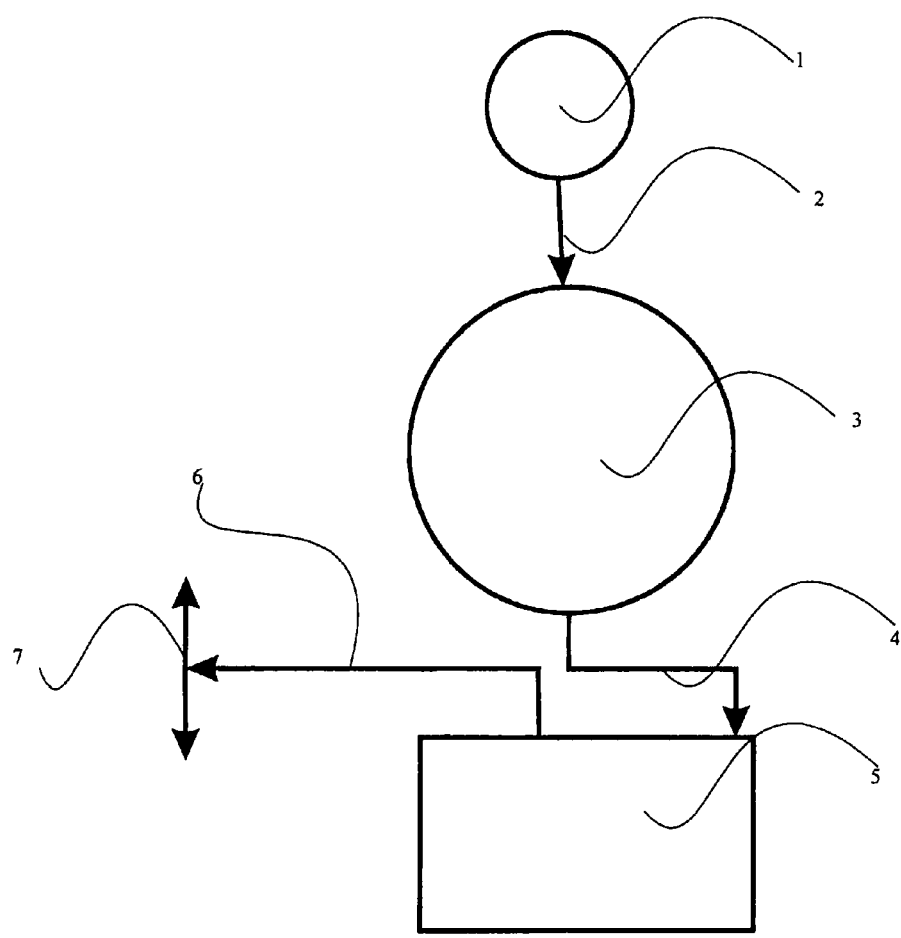
FIG. 1 is a schematic diagram of a tank arrangement for a space experiment with a pressurized driving gas tank, a fluid supply tank and a separator tank according to the invention.

FIG. 1 schematically shows a typical tank arrangement that is used in a high altitude research or sounding rocket, or other space vehicle for conducting a space experiment, for example. This tank arrangement includes a pressurized driving gas tank 1 that is connected via a pressurizing line 2 with a supply or test tank 3, which contains a fluid, e.g. a liquid, a gas and/or a mixture of liquid and gas that is to be used for the experiment. A pressurized driving gas stored in the tank 1 pressurizes the supply tank 3 through the pressurizing line 2 and thereby drives the fluid out of the supply tank 3 through a supply line 4 to a separator tank 5. Because the fluid supplied from the tank 3 via the supply line 4 may include liquid, gas and/or a liquid-gas mixture, the separator tank 5 is provided to separate the liquid from the gas and store the liquid within the tank 5, which thus also serves as a liquid reservoir. Then the pure gas, from which all liquid has been separated and removed, is emitted or output from the separator tank 5 through a gas extraction line 6, for example to further degassing lines 7.

Figure 2:
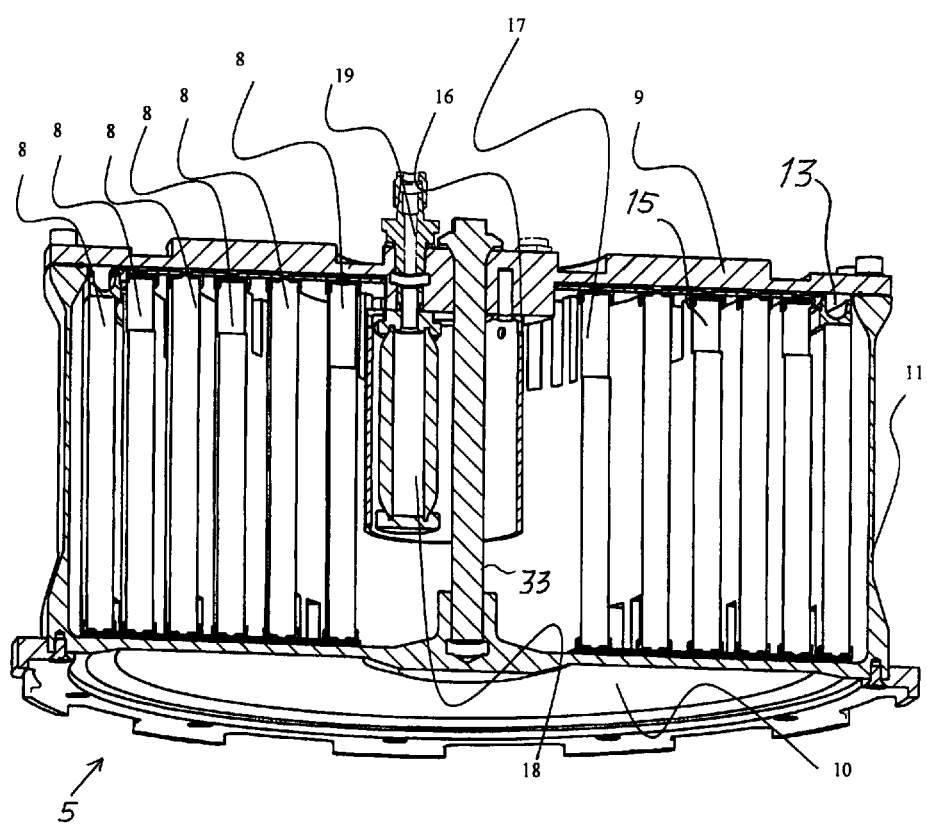
FIG. 2 is a bottom-front perspective sectional view of an axial section through the separator tank according to FIG. 1.
Figure 4:
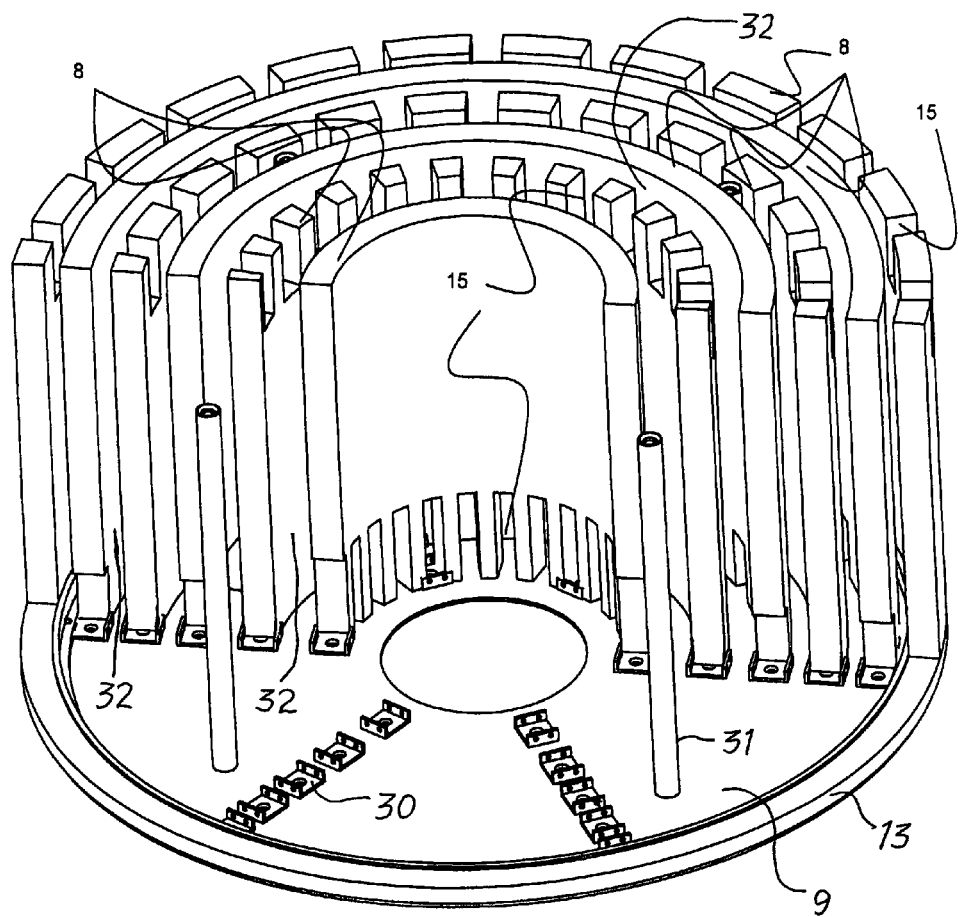
FIG. 4 is a bottom-front perspective view of further details of the internal construction of the separator tank according to FIG. 2, whereby the tank has been opened and partially disassembled for clarity and simplicity of the illustration (note that FIG. 4 is upside-down relative to FIGS. 2 and 5)
Figure 5:
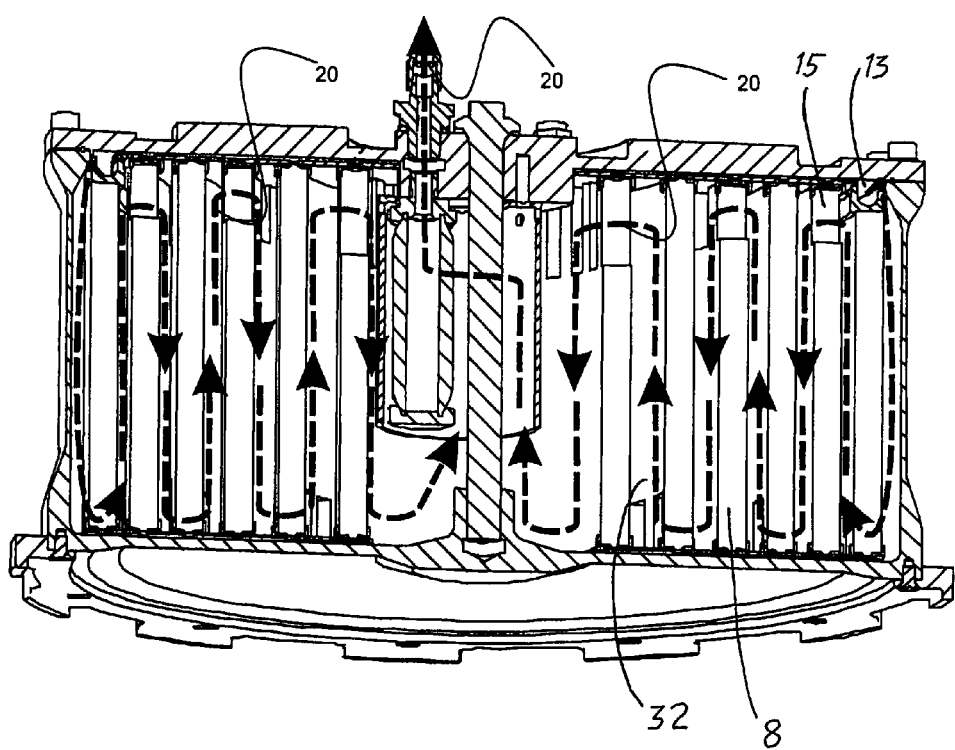
FIG. 5 is a bottom-front perspective sectional view similar to FIG. 2, but additionally showing the fluid flow path through the separator tank.

While the other components shown in FIG. 1 can have any construction and arrangement that is conventionally known, the separator tank 5 is specially constructed according to the invention, as further shown and described in connection with FIG. 2. Namely, in the present example embodiment, the separator tank 5 includes a tank vessel with a generally cylindrical configuration, especially to fit well into the rocket or other spacecraft in which the tank is to be arranged. The tank vessel includes a cylindrical outer wall 11, a generally circular disk-shaped top cover 9, and a generally circular disk-shaped bottom cover 10, so as to bound a main tank interior space therein. The cylindrical configuration of the separator tank 5 as shown in FIGS. 2, 4 and 5 is merely a representative example, while generally the configuration of the tank can be suitably matched to the shape of the spacecraft or area of the spacecraft in which the tank is to be installed.

The separator tank 5 further includes plural liquid storage members 8 arranged in the tank interior space. In the present example embodiment, these liquid storage members 8 are generally annular cylindrical plate-shaped members 8 as can be seen in FIGS. 2 and 4, for example. Each individual annular cylindrical plate can be a complete annular circular cylinder, or merely a portion of a circle, i.e a segment of a cylinder whereby plural plates are assembled together to form each complete circular cylinder. The several liquid storage members 8 are arranged as concentric annular cylinders within the tank interior space inside the tank vessel as can be seen in FIGS. 2 and 4. For example, each annular cylinder-shaped liquid storage member 8 is held in place by suitable clips 30 mounted on the top cover 9 as can be seen in FIG. 4 (and similarly on the bottom cover 10). Alternatively, the members 8 are mounted by clips 30 onto an assembly plate (instead of directly onto the top cover 9 as indicated in FIG. 4), and this assembly of the members 8 carried by the assembly plate is then arranged into the interior space of the separator tank 5 before the top cover is mounted. For structural support and stability, a connector or support post or bolt 33 connects and extends between the top cover 9 and the bottom cover 10 at the axial center thereof (see FIG. 2), and support rods or columns 31 may extend between and be secured to the top cover 9 and bottom cover 10 (see FIG. 4), but such rods or columns can be omitted if the remaining structural components provide sufficient structural strength.

The liquid storage members 8 each comprise, and in the simplest embodiment consist of, an open-celled porous metal foam, which is preferably an aluminum foam in the present example, but may alternatively be another metal or alloy foam, especially a N lightweight metal or alloy foam. The pore size, pore shape, overall porosity, and total pore volume of the foam material are designed or selected suitably with respect to the particular liquid that is to be separated and taken-up, so as to provide the required capillary action. Not shown in FIG. 2, each liquid storage member 8 may further include a retaining or supporting cover such as a metal mesh or grid on one or both major cylindrical surfaces thereof, and/or a solid imperforate or impermeable cover layer one or both major cylindrical surfaces thereof to control the radial flow of fluid into or through the thickness of the metal foam.

Figure 3:
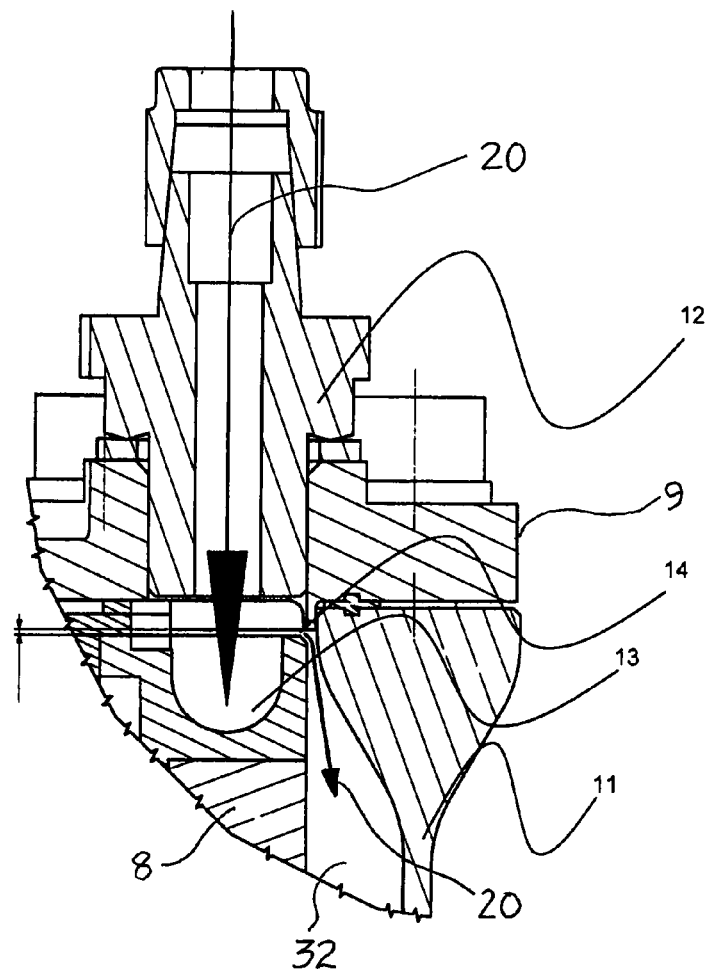
FIG. 3 is an enlarged detail view of a section through a portion of the separator tank according to FIG. 2.

FIG. 3 shows an enlarged detail view of a portion near an upper outer edge of the tank 5 at which an inlet 12 enters into the separator tank 5. The inlet 12 communicates into a circumferentially extending, circular, distribution and injection channel 13, which serves to circumferentially distribute the inflow 20 of fluid and inject it through an annular injection or inflow gap 14 into the interior space of the separator tank 5 along the cylindrical outer wall 11 thereof as can be seen in FIG. 3. Thereby, the inflow of fluid (e.g. a liquid-gas mixture) is uniformly distributed about the circumference of the tank 5 to flow into the annular space between the outermost liquid storage member 8 and the cylindrical outer wall 11 of the tank 5.

As can be seen in FIG. 2 but especially in FIG. 4, each liquid storage member 8 is provided with openings, which may be through-holes, through-recesses or notches 15 near the upper end or lower end thereof. The term "near" means at, adjacent to, or proximate to, but in the present example embodiment, the openings are notches formed at the axial end edge. Particularly, the notches or recesses 15 are alternately provided at the lower end and at the upper end of successive alternating liquid storage members 8 progressing radially inwardly toward the center of the tank. In the example embodiment shown in FIGS. 2, 4 and 5, the arrangement includes six coaxial annular cylindrical liquid storage members 8 of which the radially outermost one has notches 15 at the bottom edge thereof, the second member 8 from the outside has the notches 15 at the top edge thereof, the third member 8 from the outside has the notches 15 at the bottom edge thereof, etc., in an alternating fashion. As can also be seen in FIG. 4, annular spaces 32 are formed radially between successive adjacent liquid storage members 8. These annular spaces 32 and the notches 15 at alternating upper or lower ends of the liquid storage members 8 form a meandering flow path 20 (especially see FIG. 5) of the fluid through the interior space of the tank 5. Thereby the members 8 are arranged as alternately staggered baffles that form the meandering flow path 20 therebetween. In an alternative embodiment, instead of notches cut or recessed into the metal foam of each member 8, spacer members can be arranged between the axial end of the metal foam and the cover of the tank, to form the openings 15 circumferentially between the spacer members.

FIG. 2 further shows that a cylindrical sleeve 16, in the manner of a baffle sleeve, is arranged eccentrically offset from the axis in the center of the separator tank 5, in a cylindrical space coaxially within the radially innermost one of the liquid storage members 8. This cylindrical sleeve 16 extends downwardly from the top cover 9 and is thus positioned radially inwardly from the pore openings 17 and particularly the recesses or notches 15 of the radially innermost one of the liquid storage members 8. The sleeve 16 is solid or imperforate to baffle the flow, but does not extend downwardly all the way to the bottom cover 10, but rather leaves an open space near the bottom. The sleeve 16 may also have throughholes of appropriate sizes and locations and/or fine-mesh openings. Additionally, a further inner sleeve 18 of a metal mesh or screen is arranged internally within the cylindrical sleeve 16. The central interior hollow space of the metal mesh inner sleeve 18 communicates into an outlet 19 that discharges gas from the separator tank 5. This metal mesh sleeve 18 serves the function of a screen of sieve or filter cartridge to filter out any particles or other contaminants and prevent such contaminants from flowing out through the outlet 19 to valves or other devices connected downstream from the separator tank 5, to prevent contamination and/or malfunction of such downstream devices.

As mentioned above, the separator tank 5 serves to separate and retain liquid out of a liquid-gas fluid mixture. This liquid separation process will now be described in further detail with reference to FIG. 5. The fluid flow path 20 of the fluid (e.g. liquid-gas mixture) through the separator tank 5 is illustrated by dashed arrows in FIG. 5. This fluid flow path 20 originates in the inlet 12, and from there into and circumferentially around the annular injection channel 13, and thence through the annular injection gap 14 into the outermost annular space 32 between the cylindrical outer wall 11 of the tank vessel and the outermost one of the liquid storage members 8, as shown in FIG. 3. From there, the flow path 20 is further shown in FIG. 5, progressing in a meandering or alternating fashion downwardly, then upwardly, then downwardly, then again upwardly, etc., through successive ones of the annular spaces 32, which are connected successively with one another in a radially inward direction through the recesses or notches 15 provided alternately at the bottom or the top end of the successive liquid storage bodies 8. As mentioned above, one or both annular cylindrical surfaces of each member 8, or any portion thereof, may be covered by an imperforate cover layer to prevent or limit the flow of liquid, gas and/or liquid-gas mixture in a radial direction through the thickness of the member 8. This ensures a meandering flow of the fluid as discussed above. If both annular cylindrical surfaces of a respective liquid storage member 8 are covered with an imperforate cover layer, then the internal pores of the metal foam core of the member 8 are exposed at least in the recesses or notches 15, through which the capillary absorption of liquid will then take place. Otherwise, if at least one of the cylindrical surfaces of the liquid storage member 8 is uncovered to expose the open pores of the metal foam, then the capillary absorption of liquid occurs along this entire cylindrical surface of the respective liquid storage member 8. In this manner the capillary absorption can be controlled as desired.

Figure 6:
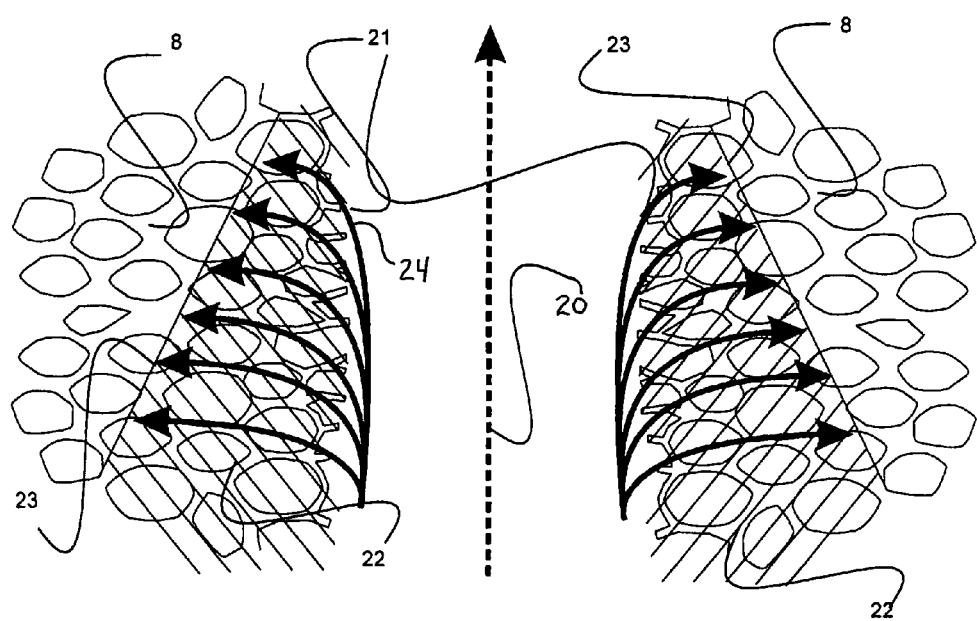
FIG. 6 is a greatly enlarged sectional view in a diagrammatic sketch of the separation of the liquid from the gas, and capillary absorption of the liquid into the porous metal foam of the liquid storage members in the separator tank according to FIG. 2.

Namely, as the liquid-gas mixture fluid flows along the meandering path 20, wherever it flows along exposed open pores of the porous core of metal foam of a respective liquid storage member 8, the capillarity of the pores of the metal foam achieves a capillary attraction and absorption of the liquid 21 into the pores or hollow spaces of the sponge-like metal foam liquid storage member 8, as schematically represented in FIG. 6. The diagonally hatched regions 22 represent the liquid saturated region of the metal foam. This saturated region 22 becomes larger or expands with increasing liquid quantity, because the capillarity of the sponge-like metal foam material draws the liquid 21 ever farther into the metal foam body of the liquid storage member 8 as represented by the capillary flow arrow 24. Thus, the momentary boundary 23 of the region 22 saturated with liquid 21, relative to the gas in the rest of the metal foam body, moves progressively deeper inward into the metal foam body as the capillary absorption of liquid progresses until the metal foam reaches complete or maximum saturation with the liquid 21.

If the pore volume of the sponge-like metal foam body of the liquid storage member 8 (in total for all of the liquid storage members in the separator tank 5) is selected to be at least as large as the total quantity of the liquid 21 entering into the tank 5, and if the capillarity of the pores is sufficiently selected, then a complete absorption and storing of all of the liquid in the metal foam will be achieved.

As the liquid-gas mixture fluid progresses farther along the meandering fluid flow path 20, the proportional content of liquid progressively diminishes and the proportional content of gas in the fluid progressively increases. Also, as the flow path 20 progresses radially inwardly toward the center of the tank 5, in view of the diminishing radius, therefore the surface area of each successive member 8 diminishes, and the cross-sectional area of each successive annular space 32 would also diminish if the radial spacing of each space 32 is the same. But in order to achieve an approximately constant flow cross-section and flow velocity of the liquid-gas mixture fluid, and therewith also a uniform penetration of the liquid 21 into the sponge-like metal foam liquid storage members 8, therefore the radial spacing distance between successive annular liquid storage members 8 becomes progressively larger from the outside toward the inside. Namely, as can be seen in FIGS. 2, 4 and 5, the radial widths of the annular spaces 32 become successively larger in a direction progressing radially inwardly from the cylindrical outer wall 11 toward the central axis of the tank 5. That counteracts the diminishing radius, to provide approximately the same radial cross-sectional area in each annular space 32. Similarly, the axial length or height of the notches 15 becomes larger on successive liquid storage members 8 progressing in a radially inward direction as can be seen in FIGS. 2, 4 and 5. Alternatively, the number of notches 15 provided on radially inwardly successive members 8 can be successively increased. This provides a progressively stepwise increasing cross-sectional flow area through for the meandering fluid flow path 20 as it progresses through successive annular spaces 32 and notches 15.

Figure 7:
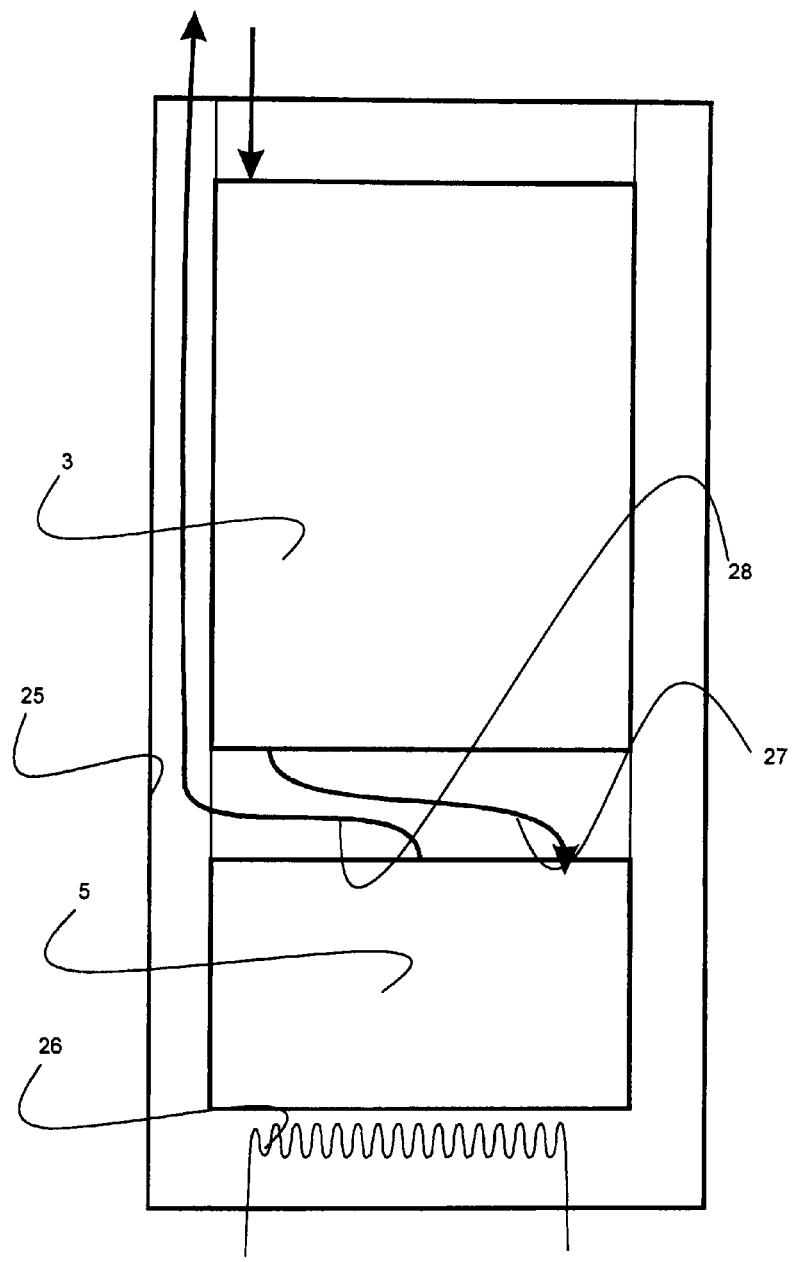
FIG. 7 is a schematic diagram of a tank arrangement including a supply or test tank and a separator tank in a cryostat for use with a cryogenic liquid.

The above described separator tank 5 according to the invention is suitable for use with both cryogenic as well as non-cryogenic liquids. FIG. 7 particularly shows an example embodiment of a tank arrangement in which the inventive separator tank 5 is used for cryogenic liquids. For such an application, it is important that the temperature of the separator tank 5 is maintained close to the cryogenic liquid temperature. For this reason, in such a cryogenic application, the separator tank 5 is installed together with the supply or test tank 3 in the interior of a cryostat 25, in which a heater 26 is additionally arranged. Furthermore, FIG. 7 schematically shows a gas and liquid supply line or arrangement 27 as well as a gas extraction line or arrangement 28.

At the beginning of a mission, the separator tank 5 is filled with liquid, of which the temperature can be adjusted by suitable adjustment of a prescribed pressure according to a corresponding saturation curve for this liquid. Then the liquid will evaporate over time, causing a cooling of the separator tank 5, so that at the beginning of the actual use for an experiment or the like, the separator tank 5 takes on cryogenic temperatures. Once the liquid originally in the tank is completely vaporized, then the separator is ready for use to separate liquid from an inflowing liquid-gas fluid mixture. For accelerating the evaporation process, the heater or heating arrangement 26 is additionally provided in the cryostat 5, for preparing the separator tank 5 for use.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A tank arrangement comprising a liquid separator tank adapted to separate a liquid from a gas,
wherein said liquid separator tank comprises a tank vessel having a tank inlet into which a fluid including a liquid, a gas and/or a liquid-gas mixture is to be introduced and having a tank outlet from which pure gas without liquid is to be emitted,
wherein said liquid separator tank further comprises plural liquid storage members that are arranged in said tank vessel and that comprise an open-celled porous metal foam material having pores adapted to take-up the liquid from the fluid,
wherein all of said metal foam material of all of said liquid storage members has a total pore volume of said pores greater than a volume of the liquid to be taken up, and
wherein said liquid storage members are:
(A) arranged as alternately staggered baffles between said inlet and said outlet to establish a meandering fluid flow path that meanders back-and-forth successively along and around said alternately staggered baffles from said inlet to said outlet, or
(B) configured as annular cylindrical plates arranged as plural coaxial annular cylinders spaced apart radially from one another by respective annular spaces, in a main interior space within said tank vessel.

2. The tank arrangement according to claim 1, wherein said pores of said metal foam material are configured and dimensioned to produce a capillary action with respect to the liquid, such that the liquid is taken-up and retained in said pores by said capillary action.

3. The tank arrangement according to claim 2, wherein said pores take-up and retain the liquid by said capillary action even under weightless conditions and even under accelerations arising during operation of a spacecraft in which said tank arrangement is installed.

4. The tank arrangement according to claim 1, wherein said metal foam consists of aluminum.

5. The tank arrangement according to claim 1, wherein each one of said liquid storage members respectively consists of said metal foam material.

6. The tank arrangement according to claim 1, wherein each one of said liquid storage members respectively comprises an imperforate cover layer covering all or a portion of one major surface of said metal foam material.

7. The tank arrangement according to claim 1, wherein said tank vessel comprises a cylindrical outer wall, a top cover on an upper open end of said cylindrical outer wall, and a bottom cover on a lower open end of said cylindrical outer wall.

8. The tank arrangement according to claim 7, wherein said liquid separator tank further comprises a circumferentially extending circular injection channel arranged coaxially along a radially inner side of said cylindrical outer wall, said tank inlet communicates into said circular injection channel, and said circular injection channel communicates through an annular gap in a direction outwardly toward said cylindrical outer wall into a main interior space within said tank vessel.

9. The tank arrangement according to claim 1, wherein said liquid storage members are arranged as said alternately staggered baffles between said inlet and said outlet to establish said meandering fluid flow path that meanders back-and-forth successively along and around said alternately staggered baffles from said inlet to said outlet.

10. The tank arrangement according to claim 1, wherein said liquid storage members are configured as said annular cylindrical plates arranged as said plural coaxial annular cylinders spaced apart radially from one another by said respective annular spaces, in said main interior space within said tank vessel.

11. The tank arrangement according to claim 10, wherein said liquid storage members each have openings passing through a radial thickness thereof at one axial end thereof, and said axial ends of said liquid storage members having said openings alternate axially on radially successively adjacent ones of said liquid storage members.

12. The tank arrangement according to claim 11, wherein dimensions and/or a number of said openings on each one of said liquid storage members is selected to provide an equal flow cross-sectional area respectively through each one of said coaxial annular cylinders.

13. The tank arrangement according to claim 11, wherein an opening area of each one of said openings is relatively larger on a radially inner one of said liquid storage members and relatively smaller on a radially outer one of said liquid storage members.

14. The tank arrangement according to claim 10, wherein radial spacing distances of said respective annular spaces between adjacent ones of said annular cylinders differ from one another to provide an equal cross-sectional area, on a radial section plane, of each one of said annular spaces.

15. The tank arrangement according to claim 10, wherein a radially inner one of said annular spaces is relatively larger in a radial direction, and a radially outer one of said annular spaces is relatively smaller in the radial direction.

16. The tank arrangement according to claim 1, wherein said liquid separator tank further comprises a sleeve arranged near an axial center of said tank vessel, said tank outlet communicates with a space inside said sleeve, and said sleeve is arranged around said tank outlet and is interposed between said tank outlet and flow openings of a radially innermost one of said liquid storage members.

17. The tank arrangement according to claim 16, wherein said liquid separator tank further comprises a filter cartridge, screen or mesh arranged inside said sleeve and surrounding said tank outlet.

18. The tank arrangement according to claim 1, further comprising a cryostat and a fluid supply tank, wherein an outlet of said fluid supply tank is connected to said tank inlet of said liquid separator tank, wherein said fluid supply tank and said liquid separator tank are arranged in said cryostat, and wherein said liquid separator tank is adapted to separate and retain a cryostatic liquid as the liquid.

19. The tank arrangement according to claim 18, further comprising a heater arranged in said cryostat.

20. A tank arrangement in a spacecraft, said tank arrangement comprising a liquid separator tank adapted to separate a liquid from a gas,
wherein said liquid separator tank comprises a tank vessel having a tank inlet into which a fluid including a liquid, a gas and/or a liquid-gas mixture is to be introduced and having a tank outlet from which pure gas without liquid is to be emitted,
wherein said liquid separator tank further comprises plural liquid storage members that are arranged in said tank vessel and that comprise an open-celled porous metal foam material having pores adapted to take-up the liquid from the fluid,
wherein all of said metal foam material of all of said liquid storage members has a total pore volume of said pores greater than a volume of the liquid to be taken up, and
further comprising a fluid supply tank having an outlet thereof connected to said tank inlet of said liquid separator tank, and a pressurized driving gas tank connected to a pressurizing inlet of said fluid supply tank.

21. A liquid separator tank adapted to separate a liquid from a gas, comprising:
- a cylindrical tank vessel;
- a tank inlet near a radially outer perimeter of said tank vessel;
- a tank outlet near a central axis of said tank vessel; and
- plural annular cylindrical baffles arranged coaxially in said tank vessel and spaced radially apart from one another, wherein said baffles comprise a metal foam having open-celled pores configured and dimensioned to provide a capillary attraction with respect to the liquid.

* * * * *